US007969364B2

(12) United States Patent
Kriebel et al.

(10) Patent No.: US 7,969,364 B2
(45) Date of Patent: Jun. 28, 2011

(54) RADIO FREQUENCY DEVICE AND METHOD OF MANUFACTURE

(76) Inventors: Frank Kriebel, Lichtenberg (DE); Robert Semar, Dresden (DE)

( * ) Notice: Subject to any disclaimer, the term of this patent is extended or adjusted under 35 U.S.C. 154(b) by 138 days.

(21) Appl. No.: 12/128,823

(22) Filed: May 29, 2008

(65) Prior Publication Data

US 2008/0297421 A1    Dec. 4, 2008

Related U.S. Application Data

(60) Provisional application No. 60/941,054, filed on May 31, 2007.

(51) Int. Cl.
*H01Q 1/38* (2006.01)
(52) U.S. Cl. .................... 343/702; 343/881; 343/895
(58) Field of Classification Search ................. 343/702, 343/742, 867, 895, 881, 882; 340/572.7
See application file for complete search history.

(56) References Cited

U.S. PATENT DOCUMENTS

| 4,894,663 | A | * | 1/1990 | Urbish et al. | ................. 343/702 |
| 6,646,554 | B1 | * | 11/2003 | Goff et al. | ................. 340/572.6 |
| 6,693,539 | B2 | * | 2/2004 | Bowers et al. | ............. 340/572.1 |

* cited by examiner

*Primary Examiner* — Michael C Wimer
(74) *Attorney, Agent, or Firm* — Tue Nguyen

(57) ABSTRACT

A radio frequency device comprises a radio frequency transponder having a radio frequency circuit and a radio frequency antenna, and a sensor conductively connected to the radio frequency antenna so that a measurement can be retrieved from the sensor by communicating with the transponder. The radio frequency antenna comprises a first portion which is used primarily for receiving and/or sending of radio frequency signals, and a second portion which is used primarily for conductively connecting the sensor to the first portion of the radio frequency antenna and which enables placing the sensor in a spaced-apart spatial relation to the first portion of the radio frequency antenna.

17 Claims, 3 Drawing Sheets

RADIO FREQUENCY DEVICE AND METHOD OF MANUFACTURE

CROSS REFERENCE TO RELATED APPLICATIONS

This application claims priority of U.S. provisional application No. 60/941,054 filed May 31, 2007, which application is incorporated herein by reference.

BRIEF SUMMARY OF THE INVENTION

Disclosed herein are a radio frequency device and its method of manufacture.

One example of such radio frequency device is an RFID tag or label commonly used for identification of persons, animals or goods, tracking or theft protection of goods, access control for restricted areas, electronic payment systems, and so on. Radio frequency identification (RFID) is a technology that uses radio waves sent by a so called reader at a certain frequency that can be received by a so called transponder, label or tag. The transponder consists of an antenna that is adjusted to a certain frequency, and a transponder chip that is designed to process signals and may be also designed to hold certain data. If the transponder enters the field of the reader, it can take enough energy out of the field to be able to work. In doing so it gives the memorized information back to the reader by using its antenna, and the reader becomes the receiver of the data. Consequently, RFID technology enables the transmittance of data from a transponder to a reader without the need for line of sight.

The device disclosed herein further comprises a sensor to collect certain data, as for instance temperature, pressure, humidity, position, acceleration, or other physical or chemical quantities, whose inspection, monitoring or surveillance may be important during processing, distribution, and/or storage of certain goods or for other purposes such as process control and the like. An exemplary application of the device is the monitoring of perishable goods during storage and transport. Using the device makes it easier to monitor the temperature of the goods during transportation because the sensor can be positioned close to where the temperature is to be measured while the radio frequency antenna can be disposed in another place to avoid obstruction or degradation of the signal.

To this end, the sensor is arranged at a distance from the receiving/sending portion of the radio frequency antenna and is connected to the receiving/sending portion by means of a connecting portion of the radio frequency antenna formed and serving as an extension or connecting circuit interconnecting the sensor and the receiving/sending portion. For example, the sensor is placed in contact with goods to be monitored and the receiving/sending first portion of the antenna is placed at a distance from the goods. The connecting second portion of the antenna establishes a communicating connection between the sensor and the antenna, enabling retrieval of data from the sensor by wirelessly communicating with the device via the outside antenna.

The connection between the sensor and the receiving/sending antenna portion via the connecting antenna portion may be a direct connection, as for instance when the receiving/sending antenna portion and the connecting antenna portion are integrated in a continuous wiring or dipole, or be an indirect connection, as for instance when the receiving/sending antenna portion and the connecting antenna portion are separate wirings or a separate dipole, as will be described in more detail below. In the latter case, the radio frequency circuit may be disposed between the receiving/sending antenna portion and the connecting antenna portion and be electrically connected to both portions.

The first portion of the radio frequency antenna may be disposed on a first portion of a common carrier and the second portion of the radio frequency antenna may be disposed on a second portion of a common carrier. The carrier may be a sheet-like substrate, as for instance paper or a polymer sheet or film. If the second portion of the common carrier extends away from the first portion of the common carrier, then the sensor which is disposed at the free end of the connecting portion can easily be placed at the desired distance from the receiving/sending portion of the radio frequency antenna.

The usage of carrier material can be improved, if the second portion of the common carrier is shaped so as to provide for folding or stretching the second carrier portion carrying the connecting antenna portion away from the first carrier portion carrying the receiving/sending antenna portion. The distance between the sensor and the receiving/sending portion of the radio frequency antenna will then be easily changeable by simply folding out or stretching the connecting portion and disposing its free end and the sensor it carries in the desired position.

In an exemplary embodiment, a fold-out-and-stretch structure of the second carrier portion is designed as a meandering strip of carrier material, i.e. a strip that follows a winding or intricate course, such as for instance a spiral or helix (winding around a center or pole and gradually receding from it) or a meander-, labyrinth- or zig-zag-shaped strip.

The meandering strip of carrier material carrying the connecting antenna portion may be disposed on a first portion of the carrier, while the receiving/sending antenna portion may be disposed on the remaining second portion of the carrier adjacent and in plane with the first portion. In this case, encapsulating the first carrier portion carrying the receiving/sending antenna portion in a protective housing or the like is relatively easy as the first carrier portion carrying the connecting antenna portion and the sender may simply be left out in the encapsulating process and subsequently, stick out of the housing laterally.

In another embodiment, the meandering strip of carrier material carrying the connecting antenna portion may be disposed on an inner portion of the carrier, while the receiving/sending antenna portion may be disposed on the outer portion of the carrier surrounding the inner portion. If the outer carrier portion carrying the receiving/sending antenna portion is to be encapsulated in an analogous manner as described above with respect to the first carrier portion, then an opening provided in at least one wall or surface of the protective housing will enable folding out and/or stretching the inner carrier portion carrying the connecting antenna portion with the sensor. In this embodiment, the second antenna portion and the sensor are well protected in the time between manufacture and use of the radio frequency device.

In yet another embodiment, the meandering strip of carrier material carrying the connecting antenna portion may be disposed on an outer portion of the carrier, while the receiving/sending antenna portion may be disposed on the inner portion of the carrier surrounded by the outer portion. If the inner carrier portion carrying the receiving/sending antenna portion is to be encapsulated in an analogous manner as described above with respect to the first carrier portion, then an opening provided in at least one wall or surface of the protective housing will enable folding out and/or stretching the outer carrier portion carrying the connecting antenna portion with the sensor. In this embodiment, the second antenna portion and the sensor are well protected in the time between manufacture and use of the radio frequency device.

The carrier material may be shaped to exhibit the two portions as described above by die-cutting or laser-cutting of the bulk carrier material, which may for instance be supplied as a paper web or film from a mandrel or spindle. Manufacturing time may be saved by making separating the devices and shaping them one single process step.

The radio frequency antenna may be made by etching, material deposition, or printing, for instance by using a process like stencil printing or screen printing silver paste onto a polymer or paper sheet carrier substrate, which provides for low-cost, high-yield mass production.

The disclosed device encompasses two basic concepts regarding the position of the radio frequency circuit of the radio frequency transponder:

According to the first concept, the radio frequency circuit is arranged in close proximity to the first antenna portion. In the above example, the radio frequency circuit would therefore be placed in close spatial relation with and connected to the receiving/sending portion. In this case, the second antenna portion would also be connected to the radio frequency circuit. It is to be understood that especially in devices designed according to this concept of the disclosed device; the connecting portion of the radio frequency antenna need not be directly connected to the receiving/sending antenna portion. It is an adherent characteristic of elongated conductors carrying electric or electronic signals to develop an electromagnetic field surrounding such conductor which makes the signal readable. Therefore, such elongated conductor (referred to as second or connecting antenna portion herein) is by definition an antenna. However, a connecting antenna portion having no connection to the receiving/sending portion will only send a relatively weak signal which is negligible when compared to the signal strength of the receiving/sending portion.

In the second concept, the radio frequency circuit is arranged near the sensor, in which case the second antenna portion connects both the radio frequency circuit and sensor to the first antenna portion. In the above example, the radio frequency circuit would be placed, together with the sensor, in close proximity to the goods to be monitored, while the first antenna portion remains at a distance.

The device may be designed such that the sensor and the radio frequency circuit are parts of a single integrated circuit which may be formed on a semiconductor die. However, the integrated circuit, comprising the sensor and/or the radio frequency circuit and/or other circuits of the device, may also be made as a printed integrated circuit. Printing of integrated circuits is an emerging technology which further helps to decrease manufacturing cost and make the device disposable.

If data is to be collected continuously or in short time intervals, but read out only in read-out intervals longer than the time interval in which data is collected, then a data memory circuit provided with the device may be helpful to accomplish this task. The memory circuit serves to store the data collected between collection and read-out times and may, in another embodiment, be part of a single integrated circuit which may incorporate the radio frequency circuit, sensor or other circuits needed or provided for use with the radio frequency device.

The device also may be designed to be enabled to take specific measurements at desired time intervals. This may, for instance, be achieved by adding a control circuit and/or a timer circuit to the device. As discussed previously with respect to the memory circuit, the control circuit and/or timer circuit may also be incorporated in a single integrated circuit comprising other circuits of the device.

The device may be passive, active or semi-active. Semi-active tags (sometimes also referred to as "semi-passive") are similar to active tags as they have their own power source, but the battery is used just to power the microchip and not broadcast a signal. The radio frequency energy is reflected back to the reader like a passive tag. In the active and semi-active embodiments, the device may have its own voltage source or be connected to an external voltage source. A voltage source is any device or system that produces an electromotive force between its terminals or derives a secondary voltage from a primary source of the electromotive force. A primary voltage source can supply (or absorb) energy to a circuit while a secondary voltage source dissipates energy from a circuit. Examples of primary sources are common batteries and capacitors while an example of a secondary source is a voltage regulator.

BRIEF DESCRIPTION OF DRAWING FIGURES

Examples and embodiments of the disclosed radio frequency device will now be described in greater detail with reference to the accompanying drawings, in which.

DETAILED DESCRIPTION

Figure 1:
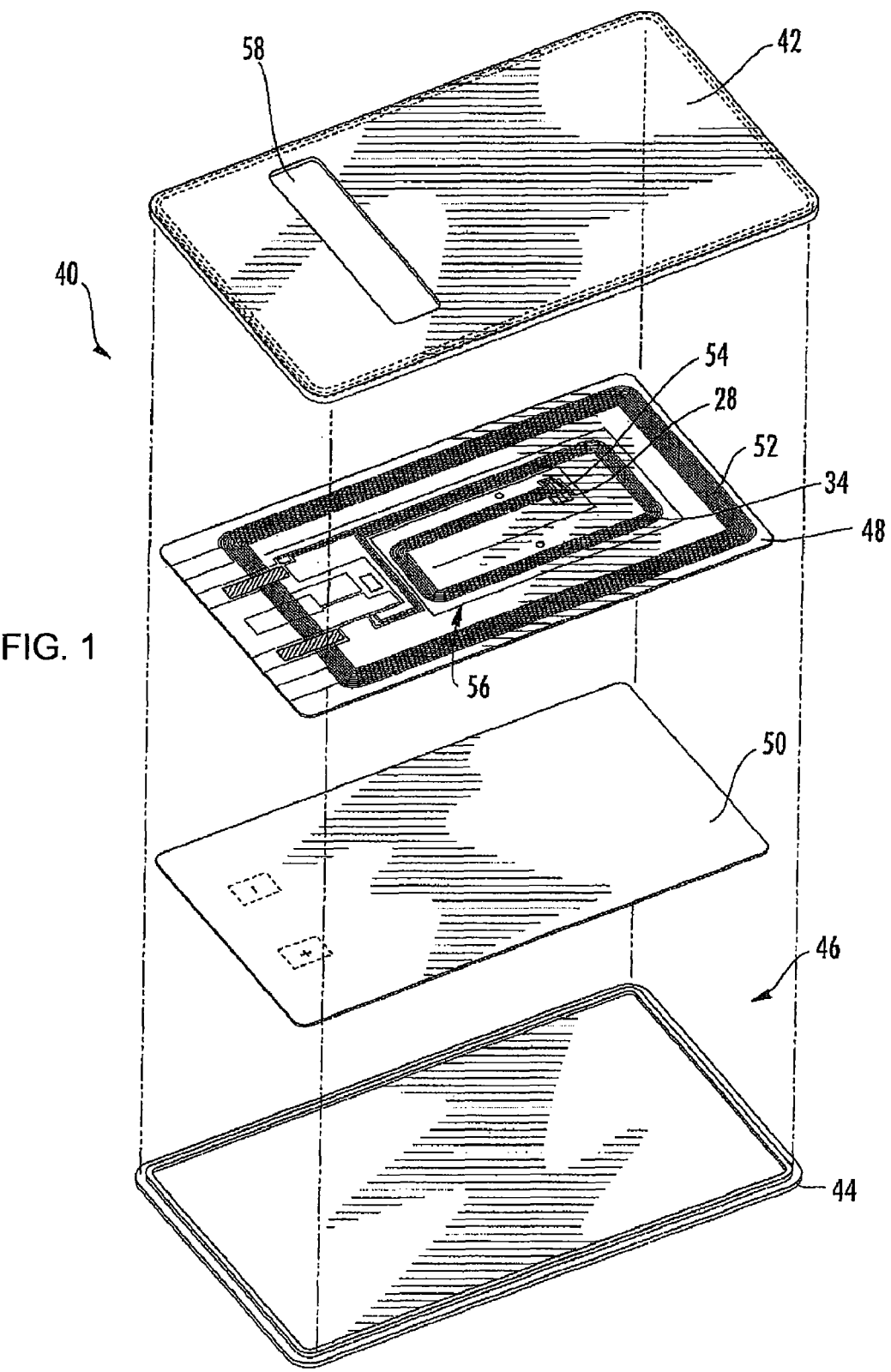
FIG. 1 is an exploded perspective view of a radio frequency device that is in accordance with one embodiment of the present invention.
Figure 2:
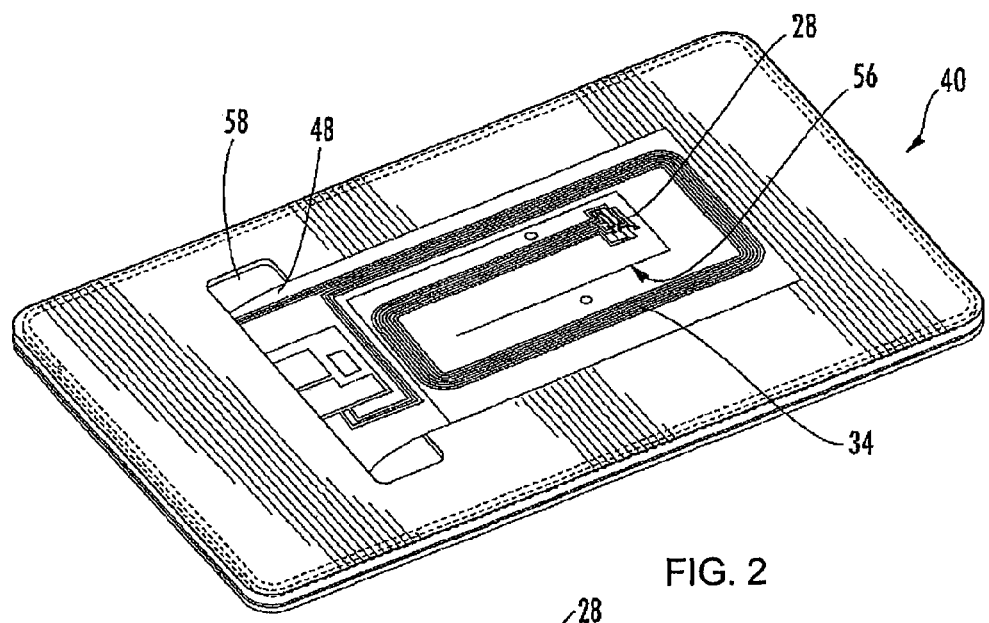
FIG. 2 is a perspective view of the radio frequency device of FIG. 2 in which an electric circuit having a sensor is depicted as extending outwardly from the radio frequency device.

In FIGS. 1 through 4, an embodiment of the invention is illustrated in which the radio frequency device includes an outer housing in which one or more components (e.g., the battery and RF transponder) of the radio frequency device are disposed. In this regard, FIG. 2 depicts an exploded perspective view of a radio frequency device 40 having two or more electronic components that are electrically interconnected. In one embodiment the radio frequency device 40 includes a first housing member 42 and a second housing member 44 that are attached together and configured to define an interior space 46 therebetween. The radio frequency device 40 includes first and second electronic components 48, 50 that are disposed in interior space 46 and that are capable of being electrically interconnected.

FIG. 1 illustrates an embodiment wherein electronic component 48 comprises a flexible sheet material having a flexible circuit that includes an RF antenna 52, an RF chip 54, and a sensor 28. In this embodiment, the RF chip of the RF transponder and the sensor 28 comprise a single integrated circuit. The RF chip and RF antenna may comprise a single integrated structure or may comprise separated components that are disposed on a single electronic component or on two or more electronic components. Electronic component 50 may comprise a power supply, such as a battery, that is electrically interconnected to electronic component 48 via opposing pairs of electrical contacts on each respective electronic component. In one embodiment, one of the housing members (e.g., housing member 42) includes an opening 58 through which the electric circuit 34 including the sensor 28 can be extended out of the housing member and be positioned in a temperature monitoring relationship with the interior space of the compartment, and at a spaced apart location from the battery 50.

In one embodiment, electric circuit 34 can be an integral part of electronic component 48. As discussed above, electric circuit 34 electrically interconnects the sensor 28 with one or more additional components of the electronic monitoring device (e.g., RF transponder, RF antenna, and battery). In other embodiments, electric circuit 34 may comprise a separate circuit that is electrically joined to the RF transponder (e.g., electronic component 48).

Figure 3:
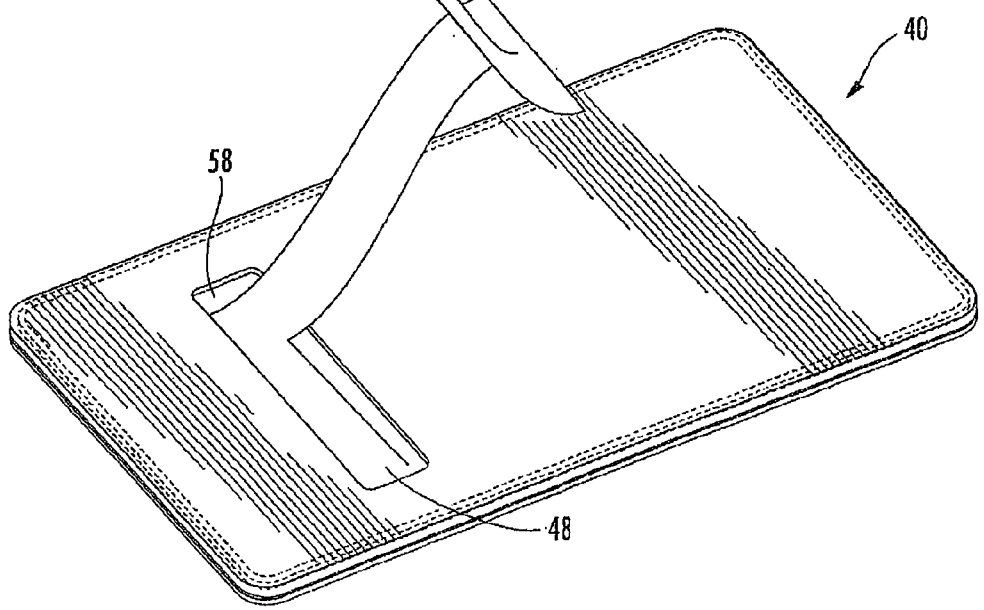
FIG. 3 is a perspective view of the radio frequency device of FIG. 1 in which the length of the electric circuit is increased so that the sensor can be positioned at a spaced apart location from the battery of the radio frequency device.
Figure 4:
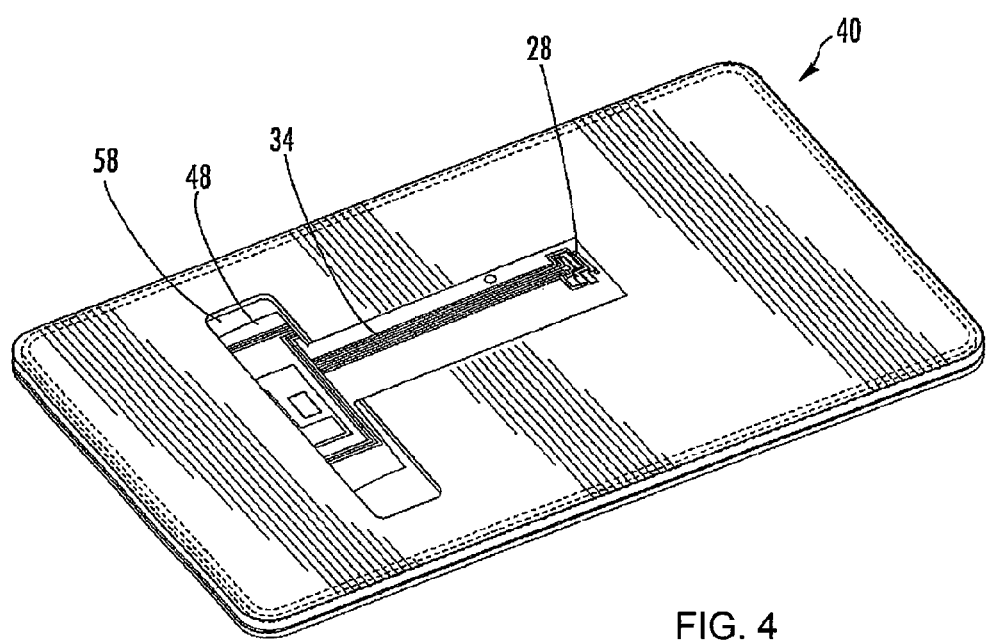
FIG. 4 is a perspective view of an alternative embodiment of the radio frequency device.

In one embodiment, the electrical circuit 34 comprises a flexible material that is capable of extending outwardly from electronic component 48 so that the sensor can be positioned in a spaced apart location from the battery. In this regard, FIG. 2 illustrates electric circuit 34 including sensor 28 extending out of the housing member through opening 58. In this embodiment, electronic component 48 includes one or more separation or cut lines 56 that define the shape and length of the electric circuit 34. In some embodiments, electric circuit 34 including the cut lines define the length of the electric circuit having a generally spiral or serpentine shape that permits the length of the electric circuit to be increased, and hence the distance between the sensor and the battery to be increased. As shown in FIGS. 3 and 4, this spiral/serpentine shape permits electric circuit 34 to have a relatively flat configuration for storage in the housing 40 so that a relatively long electronic circuit to be stored in the housing in a compact state. As shown in FIG. 3, the electric circuit 34 is capable of extending outward from the housing for positioning the sensor in a temperature monitoring relationship with goods to be monitored.

In other embodiments, the electric circuit may have a relatively shorter length. For examples, FIG. 4 depicts an embodiment wherein the electric circuit 34 has a relatively straight shape and does not include a spiral/serpentine shape. In some embodiments, the length of the electric circuit can be increased with the insertion of a strip of flexible circuit material having electrical conductors that can be aligned with existing circuitry on the electric circuit and the RF transponder and/or battery. In this embodiment, the strip of flexible circuit material can act as an extension cord in increasing the overall length of the electric circuit. Use of the flexible circuit material may permit the use of conventional radio frequency devices, such as data loggers, in the practice of the invention. In some conventional devices, the sensor and the RF transponder including the RF antenna may be formed on a single flexible sheet material. In such cases, it may be necessary to form cut lines in the flexible sheet material that separate the sensor and a portion of its circuitry from the sheet so that the sensor can be extended out of the housing. In one embodiment, the length of the electric circuit can range from about 0.5 to 12 inches and in particular, from about 1 to 6 inches.

In one embodiment, the radio frequency device may be capable of performing one or more functions, for example, identification, monitoring, and/or tracking functions. In some embodiments, the electronic devices may include one or more internal electronic components that are capable of performing one or more functions. Such electronic components may include, for example, processors, memory components, external interface components (including both wired and wireless), sensor elements, display elements (such as an LCD display), power supplies, and the like, and combinations thereof. A display element may be enabled to show a status. For instance, the display element may be configured to be an indicator of a threshold excess like the "best before" date of food or pharmaceuticals. In addition, the electronic components may include integrated circuits, transistors and diodes, and passive components such as resistors, capacitors and inductors, and the like. Examples of various types of electronic devices may include smart tags, smart cards, RF tags, RFID tags, wireless cards, wireless tags, contact cards, data loggers and the like.

In one embodiment, the radio frequency device may include one or more sensors for monitoring various conditions to which the electronic device has been exposed. In one embodiment, the electronic device may include a RF antenna that may permit wireless communication between the radio frequency device and an external interface or reader. The electronic device may also include a processor and/or memory component for processing environmental measurements and for storing such measurements. In embodiments where the electronic component includes an RF antenna, information may be wirelessly transmitted to and from the radio frequency device.

As discussed above, the electronic components may include sensor elements, display elements, an RF antenna, memory components, processors, control circuits, power supplies, and the like. In some embodiments, the electronic components may include one or more additional sensors for measuring one or more environmental conditions or other physical or chemical quantities. Exemplary environmental conditions that may be monitored include, but are not limited to, relative humidity, light intensity, on/off, open/closed, voltage, pressure, shock/vibration, and other events over time. In one embodiment, the electronic component may comprise a circuit having a control circuit and an RF antenna. In other embodiments, the electronic component may comprise a power supply, such as a battery, that may be electrically interconnected to an adjacent electronic component.

In one embodiment, the radio frequency device may include a memory component that can be configured to store data and information including, but not limited to, recorded measurements, temperature measurements as a function of time, programming and operational instructions for the electronic device, identification information, tracking information, and the like. In some embodiments, the memory may be configured to buffer data that is measured by the radio frequency device, such as flash memory or EPROM. Flash memory refers generally to a type of nonvolatile memory that can be erased and reprogrammed in units of memory called blocks. The capacity of the memory component can be varied depending upon the desired amount of data that can be stored before downloading the data into an external computer or similar device. In some embodiments the capacity of the memory component may comprise 64K, 128K, 256K, 512K, or greater memory blocks. In one embodiment, the memory component, radio frequency circuit, and the sensor may comprise a single integrated circuit. In a further embodiment, the radio frequency device may include a single integrated circuit comprising control circuit(s), the memory component, radio frequency circuit, and the sensor.

In one embodiment, the first and second housing members may define a radio frequency device that is about the size of a credit card. In some embodiments, the first and second housing members may comprise a material having a rigid or semi-rigid structure. In other embodiments, the housing member may have a more flexible structure.

The radio frequency device may include a radio frequency (RF) transceiver that can wirelessly send and receive data between the device and a reader. The radio frequency device can also include a radio frequency identification (RFID) communication means or interface that can enable wireless communication with the electronic device. In one embodiment, the radio frequency device may employ radio frequency identification (RFID) communication protocols to activate, program, and send or retrieve data to and from the electronic device. The use of RFID technology in electronic devices, such as data loggers, may permit the stored data to be quickly retrieved from the devices. For instance, an RFID reader in communication with a computer can be used to activate and retrieve data from an electronic monitoring device at various points throughout a distribution system. To retrieve the information, the electronic monitoring device may be connected to a computer or brought into close proximity with an RFID reader.

In some embodiments, the radio frequency device may be adapted to monitor and record a wide variety of conditions, such as those discussed above. Temperature monitoring devices can be activated in a wide variety of ways. In some embodiments, the radio frequency device may be manually activated by pushing a button or triggering a switch. In other embodiments, the radio frequency device can be activated through wired or wireless communication with a computer or reader, such as a RFID reader.

In one embodiment, the radio frequency device may be activated or programmed by connecting it directly to a computer or reader that can be used to send and retrieve data to and from the radio frequency device. In some embodiments, the radio frequency devices can also be activated by manual operation, such as a switch or push button. The radio frequency device can be configured to record each measurement and store it in memory. In some embodiments, the radio frequency device may also be capable of recording the date and time at which the measurement was taken so that a time-temperature history of the object being monitored can be produced. At a desired time, the data contained within the radio frequency device can be retrieved by communicating with an RF reader or similar device.

The radio frequency device includes a sensor 28 that may be disposed at a measuring position where a physical or chemical quantity is to be measured. The sensor 28 is electrically interconnected with an RF transponder or other radio frequency identification (RFID) system that can be used to track and trace products or monitor an environmental condition or with an RF communication interface protocol such as Bluetooth or Zigbee. The RF transponder generally includes an RF chip and an RF antenna. Temperature measurements can be wirelessly retrieved from the electronic monitoring device by communicating with the RF transponder using an RF reader.

In some embodiments, the sensor and RF transponder may comprise separate components of the radio frequency device. In one embodiment, the RF chip and the sensor may comprise a single integrated chip or circuit. In embodiments where the sensor and RF transponder comprise a single integrated chip or circuit, it may be desirable to position the RF antenna in a spaced-apart relationship with respect to the integrated chip or circuit to help facilitate communication between an RF reader and the RF transponder. In other embodiments, the sensor and the RF transponder are separate components that are positioned in a spaced-apart relationship with respect to each other.

The radio frequency device may also include a battery that is operatively connected with the sensor 28 and the RF transponder. The sensor 28 is operatively connected to the battery with an electric circuit 34. Electric circuit 34 permits the battery to be positioned at a spaced apart location from the sensor. At relatively low temperatures, the battery may have reduced performance or may fail to function altogether. To prevent failure of the battery, the battery may be positioned at a location that is spaced apart from the sensor.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A radio frequency device comprising:
    a radio frequency transponder having a radio frequency circuit and a radio frequency antenna; and
    a sensor conductively connected to the radio frequency antenna so that a measurement can be retrieved from the sensor by communicating with the transponder; wherein the radio frequency antenna comprises a first portion which is used primarily for receiving and/or sending of radio frequency signals, and a second portion which is used primarily for conductively connecting the sensor to the first portion of the radio frequency antenna and which enables placing the sensor in a spaced-apart spatial relation to the first portion of the radio frequency antenna,
    wherein the first portion of the radio frequency antenna is disposed on a first portion of a common carrier and the second portion of the radio frequency antenna is disposed on a second portion of a common carrier, and
    wherein the second portion of the common carrier comprises a fold-out-and-stretch structure to provide for folding or stretching said second portion away from the first portion of the common carrier and thus, to increase the distance between the sensor and the first portion of the radio frequency antenna.

2. The radio frequency device of claim 1, wherein the second portion of the common carrier extends away from the first portion of the common carrier so as to enable placing the sensor at a distance from the first portion of the radio frequency antenna.

3. The radio frequency device of claim 1, wherein the radio frequency antenna is printed on the common carrier.

4. The radio frequency device of claim 1, wherein the radio frequency antenna is made by etching a conductive layer deposited on the common carrier.

5. The radio frequency device of claim 1, wherein a single integrated circuit incorporates both the sensor and the radio frequency circuit.

6. The radio frequency device of claim 5, wherein the integrated circuit further incorporates a memory circuit.

7. The radio frequency device of claim 6, wherein the memory circuit is configured for storing one or more measurements.

8. The radio frequency device of claim 7, wherein the memory circuit is configured to store measurements as a function of time.

9. The radio frequency device of claim 5, wherein the integrated circuit further incorporates a controller circuit.

10. The radio frequency device of claim 5, wherein the integrated circuit further incorporates a timer circuit.

11. The radio frequency device of claim 5, wherein the integrated circuit comprises a printed circuit.

12. The radio frequency device of claim 1, further comprising a voltage source operatively connected with the radio frequency transponder.

13. The radio frequency device of claim 1, further comprising a voltage source operatively connected with the sensor.

14. The radio frequency device of claim 12, wherein the voltage source comprises a printed battery.

15. The radio frequency device of claim 12, wherein the voltage source is printed on the first portion of the common carrier.

16. The radio frequency device of claim 1, further comprising a display element.

17. The radio frequency device of claim 16, wherein the display element comprises a status indicator.

* * * * *